No. 783,873. PATENTED FEB. 28, 1905.
W. LEININGER.
STOVE PROTECTOR.
APPLICATION FILED MAY 24, 1904.
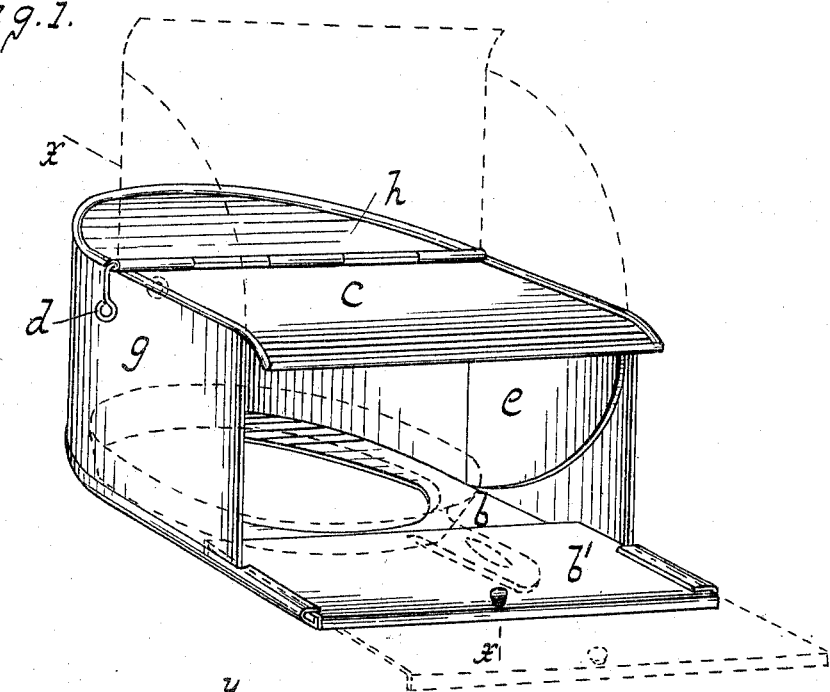
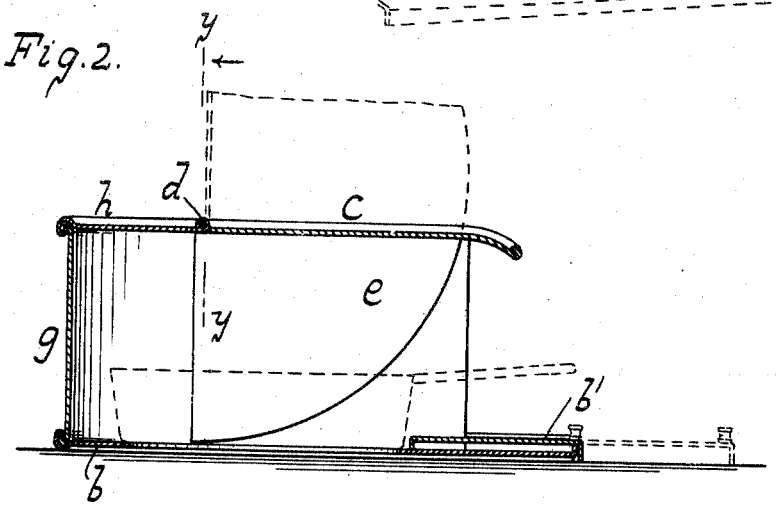
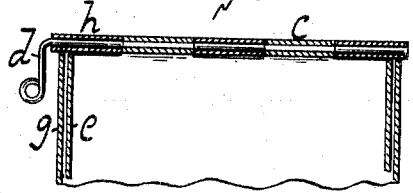
WITNESSES:
William Miller
Chas. G. Demuth
INVENTOR
William Leininger
BY
W. C. Hauff
ATTORNEY No. 783,873. Patented February 28, 1905.

UNITED STATES PATENT OFFICE.

WILLIAM LEININGER, OF NEW YORK, N. Y.

STOVE-PROTECTOR.

SPECIFICATION forming part of Letters Patent No. 783,873, dated February 28, 1905.

Application filed May 24, 1904. Serial No. 209,538.

*To all whom it may concern:*

Be it known that I, WILLIAM LEININGER, a citizen of the United States, residing in Queens borough, New York city, in the county of Queens and State of New York, have invented new and useful Improvements in Stove-Protectors, of which the following is a specification.

The object of this article is to protect the stove from becoming spattered with grease when frying meats, fish, rendering lards, and fats of all descriptions, as a preventive from grease taking fire in frying-pan or that which may spatter alongside.

I also reserve the right to make this article in all sizes, also of any metal which I may desire. I also reserve the right to make this article square, oblong, or any shape any person may desire.

This invention is set forth in the following specification and claims, and illustrated in the annexed drawings, in which—

Figure 1 is a perspective view of a protector embodying this invention. Fig. 2 is a section along $xx$, Fig. 1. Fig. 3 is a section along $yy$, Fig. 2.

In the drawings is shown a protector or device comprising a bottom $b$ with a wall $g$, inclosing or extending along the rear and sides. This rear and side inclosing-wall is shown of curve or what might be called "horseshoe" shape; but of course the shape can be varied to angular or any suitable shape desired. The rear and side inclosure has a top $h$, which can be soldered or otherwise fixed to or formed with the wall. A lid $c$ is hinged on top of the device. This lid or cover has side flaps or wings $e$, which when the lid is open maintain lateral closure. The spattering or lateral escape of matter is thus guarded against as well when the lid is open as when closed. The open position of the lid is indicated by dotted lines in Fig. 1. When the cover is in this position, the contents of the utensil placed in the protector can be readily manipulated and spilling of the same onto the stove is avoided. The bottom has a perforation, so that a utensil, such as a frying-fan, in the protector can come into contact with the stove or flame on or over which the article is placed. The bottom is flat to allow the utensil to sit or be slid while maintained in level position. An extension or movable section $b'$ can be applied to the bottom to be slid out or in as the utensil is moved out or into the device. This extension serves as a rest for the utensil when drawn or moved out of the protector and prevents fat or contents from the utensil from dropping or flowing onto the stove while the utensil is moved out for inspection or other purpose. The extension also serves another purpose. If, for example, the protector should be placed at the rear part of the stove or range, such extension when moved out will protect the forward part of the stove. Such extension when drawn outward serves to prevent the contents of the utensil when in the protector from spattering over the front part of the stove, while the protector can be used for a rear as well as a front opening of the stove.

The lid is shown hinged by a pintle $d$, having a portion bent to form a handle or projecting crank portion. The rotation of the pintle will lift or close the lid. This pintle turns loosely in the curls or knuckles of the top $h$; but such pintle is secured by suitable means—such as clamping, riveting, soldering, or otherwise—to the knuckles or curls in the lid. The lid or cover being united to the pintle and the latter being rotated by its crank or handle projection, the lid is swung or moved to open or close. The wings of the lid could be sheet-metal pieces secured to the lid or the latter could be bent or formed of one piece with the wings or side portions.

What I claim as my invention, and desire to secure by Letters Patent, is—

1. A protector comprising a bottom with sides, back and cover, said bottom having an extension or movable section adapted to support a utensil when moved out of the protector.

2. A stove-protector comprising sides, back, top and a perforated bottom, said top formed of two sections, one of which is hinged and projects over the sides at one end thereof, said hinged section provided with depending wings adapted to maintain a closure when said hinged section is moved from horizontal to vertical position, means for lifting and lowering said hinged section and a movable extension for said bottom.

In testimony whereof I have hereunto set my hand in the presence of two subscribing witnesses.

WILLIAM LEININGER.

Witnesses:
   CHAS. G. DEMUTH,
   CHAS. E. POENSGEN.